United States Patent
Adhikari et al.

(10) Patent No.: US 11,194,764 B1
(45) Date of Patent: Dec. 7, 2021

(54) TAG POLICIES FOR TAGGING SYSTEM

(71) Applicant: Amazon Technologies, Inc., Seattle, WA (US)

(72) Inventors: Vijay K. Adhikari, Sammamish, WA (US); Colin Watson, Seattle, WA (US); Sharjeel Sohail, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 16/361,097

(22) Filed: Mar. 21, 2019

(51) Int. Cl.
  *G06F 16/00* (2019.01)
  *G06F 16/16* (2019.01)

(52) U.S. Cl.
  CPC .................................. *G06F 16/164* (2019.01)

(58) Field of Classification Search
  CPC .. G06F 16/951; G06F 21/6218; G06F 40/205; G06F 11/1461; G06F 11/3006; G06F 16/00; G06F 16/38; G06F 21/60; G06F 21/604; G06F 21/6209; G06F 2201/835; G06F 2201/84; G06F 2201/86; G06F 2221/2141; G06F 2221/2149; G06F 40/169; G06F 21/31; G06F 21/606; G06F 9/455
  See application file for complete search history.

(56) References Cited

U.S. PATENT DOCUMENTS

| | | | | |
|---|---|---|---|---|
| 10,169,571 | B1* | 1/2019 | Attfield | G06F 21/50 |
| 2011/0209196 | A1* | 8/2011 | Kennedy | G06F 21/60 |
| | | | | 726/1 |
| 2012/0158725 | A1* | 6/2012 | Molloy | G06F 16/907 |
| | | | | 707/737 |
| 2012/0304247 | A1* | 11/2012 | Badger | G06F 16/951 |
| | | | | 726/1 |
| 2014/0068074 | A1* | 3/2014 | Goyal | G06F 21/6218 |
| | | | | 709/225 |
| 2014/0081968 | A1* | 3/2014 | Morris | G06F 16/907 |
| | | | | 707/736 |
| 2017/0177367 | A1* | 6/2017 | DeHon | G06F 21/52 |
| 2017/0315934 | A1* | 11/2017 | Muhlestein | G06F 3/0659 |
| 2019/0213322 | A1* | 7/2019 | Dehon | G06F 21/57 |
| 2020/0007395 | A1* | 1/2020 | Fainberg | H04L 41/12 |

OTHER PUBLICATIONS

Sleeman, M. "Improve Cloud Cost Management and Resource Governance with Tag Defaults" posted on Oracle Cloud Infrastructure Blog Mar. 12, 2019, 7 pages, downloaded from https://blogs.oracle.com/cloud-infrastructure/improve-cloud-cost-management-and-resource-governance-with-tag-defaults on Mar. 20, 2019.

\* cited by examiner

*Primary Examiner* — Yicun Wu
(74) *Attorney, Agent, or Firm* — Lowenstein Sandler LLP

(57) ABSTRACT

In an embodiment, processing logic receives a request to perform an operation with respect to a resource associated with an account. Processing logic determines a tag policy for the account, wherein the tag policy specifies a required tag for resources associated with the account, wherein the required tag comprises a key value pair comprising a tag key and an associated tag value. Processing logic determines one or more tag compliance rules of the tag policy, wherein the one or more tag compliance rules comprise a required syntax for the tag key and a set of permissible values for the tag value. Processing logic determines that the resource fails to comply with the one or more tag compliance rules of the tag policy and performs a remedial action with respect to the resource.

20 Claims, 9 Drawing Sheets

TAG POLICIES FOR TAGGING SYSTEM

BACKGROUND

Tagging services are services that add metadata called tags to resources, where the tags can include any useful information and have any format. Tags are generally represented as key value pairs, where the key can have any format and the value can have any format. For example, the keys and values can both be completely free text with no constraints placed on the formatting or content of the keys or values.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
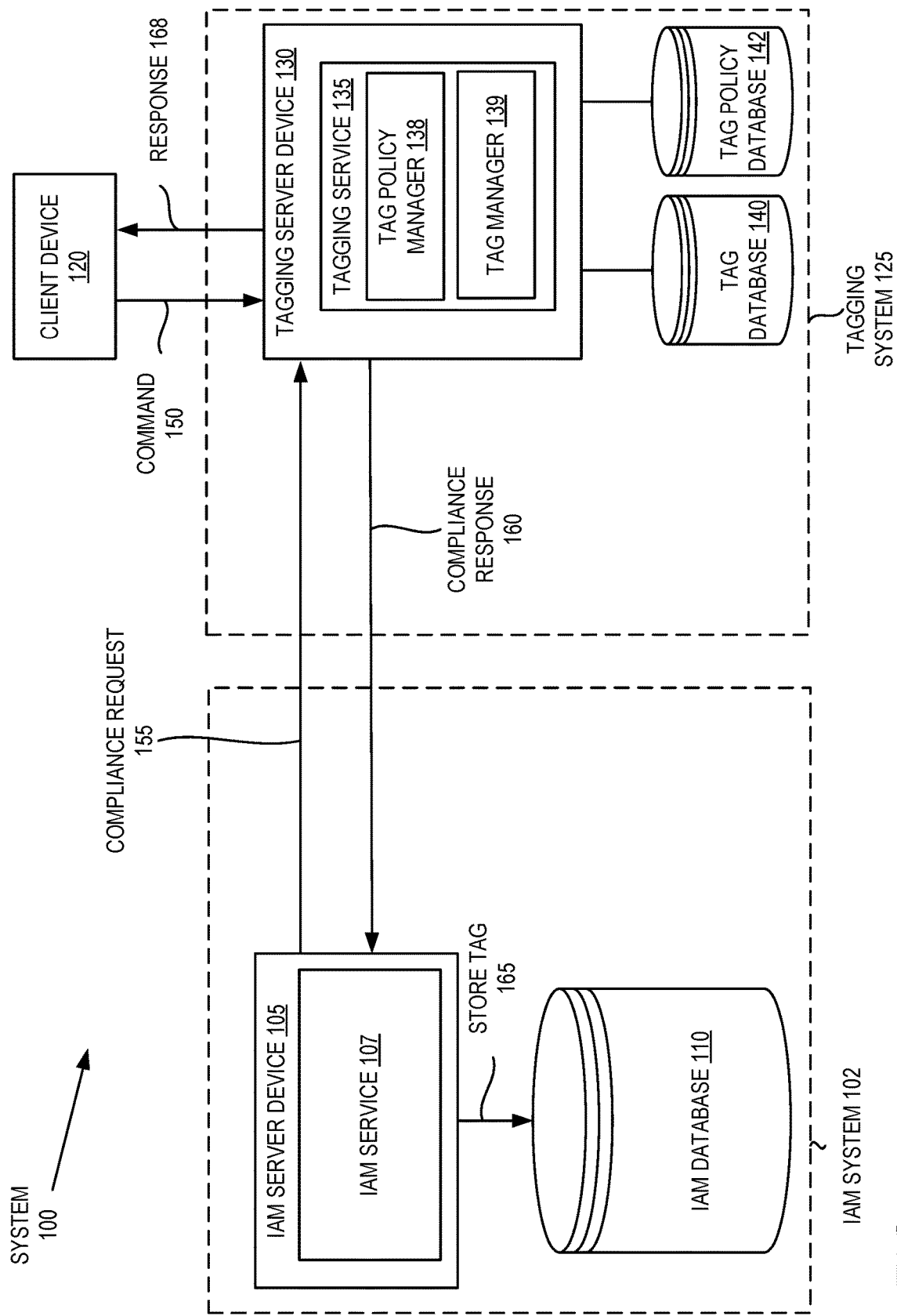
FIG. 1 is a block diagram of a tagging system that includes a tag policy manager and a tag manager, in accordance with one embodiment of the present disclosure.

This disclosure is directed to management of tags attached to resources and to a tag policy manager for a tagging system. Tags are a form of metadata that are attached to resources. A tag includes a key value pair, where there are traditionally no constraints on either the key or the value in the key value pair (e.g., the key and value may each be any free text). Tags enable organizations to place controls and restrictions on tags that otherwise may be free text. Tags enable organizations to attach classification and categorization data on resources and perform additional actions based on the classification and categorization data. The tag policy manager applies tag policies to resources. Tag policies are sets of features that enable administrators to define standardized tags, proactively enforce rules on how tags are used, and identify resources that are not in compliance with defined tagging standards across all accounts in an organization. The tag policies place constraints on the tags attached to resources to cause the tags to conform with one or more tag standards or rules specified in the tag policies. Tag policies may require resources to have specific tags, may prohibit resources from having specific tags, may dictate the syntax and/or values for the keys and/or values of one or more tags attached to resources, and so on. By ensuring consistency of tagging and complete coverage on resources across an organization, tag policies enable the organization to have organization-wide accurate tag-based allocation, automation, security and discovery.

Tags may be metadata, which may include a key-value pair. For example, a tag may be "project" and a value associated with the tag may be "green". The tag may have other values for different projects, such as "yellow," "orange," and "purple". In some instances, a wildcard value, "*", may be used to represent all values of a tag. In various embodiments, a tag may exist without a value. However, tags typically include values as a key-value pair. Other rules may be implemented for tags, such as a user may not have a same tag with two different values. Tags may include email addresses, cost centers, project identifiers, location, team name, etc. The value may be a number, letters, or a combination of both. In some embodiments, the values may be limited to certain numbers or bytes, and some numbers and/or letter combinations may be excluded for special use. Tags may be further constrained by tag policies.

Tags may be used to define access privileges of users, roles of the users, and/or groups of roles and/or users. As an example, a user may have a cost center tag with a value 1234 ("CostCenter":1234). A particular computer resource, such as a data storage location, may have an access requirement that requires users to have the tag/value "CostCenter":1234 in order to gain access to the data in the data storage. Thus, a user must have both the tag ("CostCenter") and the value of this tag (1234) to gain access. A user that does not have this tag, or has the tag, but has a different value (e.g., 4567), would be denied access. Other tag conditions may be used to determine access, as discussed below in various examples.

Tags may be added to resources. For example, a user may create a new resource and add tags to that new resource. A user may also remove tags, modify tags or tag values, and/or add tags to an existing resource.

Tags are used for many different purposes, some examples of which are accounting, tracking, security, organization, and so on. By tagging resources, administrators and users can organize and search for resources across services, applications, platforms, regions, accounts, organization units, and so on. For example, tags may be added to resources to assign cost centers to those resources. Searches may then be performed on tags to determine resource allocation to different cost centers. However, since tags are traditionally free text, users may use different designations for the same cost centers when adding tags to resources. For example, a tag for a cost center of "intranet" may have the form "CC:intranet", "CostCenter:intranet", "Cost Center:intranet", "cost centen-intranet", Cost Center:Intranet", "CostCenter:internal website", and so on. Each of these tags may represent the same cost center, but have different keys and/or different values. Accordingly, users may import tag data into a spreadsheet and then manually modify the keys and/or values in the spreadsheet to get them to match. This is a time consuming process. However, by standardizing on specific tags that are to be used, those specific tags having a) specified syntax for keys and/or values and/or b) specified values for keys and/or values. This may reduce overhead with regards to comparing, analyzing and using the data associated with tags.

Tags may also be used to enact security policies. For example, account administrators can write access control policies (e.g., of an IAM system) that state that groups of users are only permitted to access resources that have specific tags and/or that groups of users are not permitted to access resources that have specific tags. Access control policies (e.g., of an IAM system) may also state that users are only permitted to delete resources that have specific tags and/or that users are not permitted to delete resources that have specific tags.

Regardless of the use case for the tags, the functionality of the tags may be increased by applying tag policies to the tags. The tag policies enable account administrators to define standardized keys and provide lists of acceptable values for tags. The tag policies may include one or more tag compliance rules, which may place constraints on the keys and/or values of tags. Example tag compliance rules may specify capitalization requirements for tag keys and/or values, requirements for specific words in tag keys and/or values, constraints on regular expressions (regex) in keys and/or values, and so forth. A tag compliance rule may provide one or more requirements for a key of a specific tag, for keys of all tags or for keys of a set of tags. Additionally, a tag compliance rule may provide one or more requirements for a value of a specific tag, for values of all tags, or for values for a set of tags. A tag compliance rule may contain both requirements for a key portion of a tag and for a value portion of a tag. An example tag compliance rule may specify that the key for all tags should be capitalized, but may not specify any requirements for the values of tags. Another example tag compliance rule may specify that keys for all tags should be three to five characters long, and may specify that all values should be integers. Another example tag compliance rule may specify that each resource should include a tag having a key with a particular syntax (e.g., a particular key name with a particular spelling and capitalization) and a value that is one of an enumerated set of values. Another tag policy may specify that if a resource includes a tag having a particular key, then the value portion of the tag should comply with a particular regular expression (regex). Many other tag compliance rules are possible. By enforcing the tag policy, resources with tags that do not comply with the tag policy may trigger notices and/or may be blocked from generation and/or performance of other operations. The tag policies mitigate or prevent the proliferation of different terms/keys/values that mean the same thing, simplifying administration, search and use of tags.

Embodiments address the technical problem of how to manage and organize tags associated with resources of an organization. In one embodiment, a method of implementing a tag policy for a resource includes receiving a request to perform an operation with respect to a resource associated with an account. The operation may be, for example, an operation to generate the resource. The method includes determining a tag policy for the account, wherein the tag policy specifies a required tag for resources associated with the account, and wherein the required tag comprises a key value pair comprising a tag key and an associated tag value. The method further includes determining one or more tag compliance rules of the tag policy, wherein the one or more tag compliance rules comprise a required syntax for the tag key and a set of permissible values for the tag value. The method further includes determining that the resource fails to comply with the one or more tag compliance rules of the tag policy and performing a remedial action with respect to the resource. The remedial action may include blocking the requested operation (e.g., blocking generation of the resource) or permitting the operation but generating a notice indicating that the resource fails to comply with the tag policy.

The techniques and systems described herein may be implemented in a number of ways. Example implementations are provided below with reference to the following figures.

FIG. 1 is a block diagram of a system 100 that includes a tagging system 125 with a tag policy manager 138 and a tag manager 139, in accordance with one embodiment of the present disclosure. The system 100 may also include an IAM system 102 in communication with the tagging system 125.

The tagging system may include one or more tagging server device 130, a tag database 140 and/or a tag policy database 142. The tagging server device 130 may include physical machines and/or virtual machines and/or other virtual resources (e.g., containers) hosted by physical machines. The physical machines may be rackmount servers, desktop computers, or other computing devices. The virtual machines and/or containers may be managed and provided by a cloud provider system. The tag database 140 and/or tag policy database 142 may be any type of relational or non-relational database. In one embodiment, the tag database 140 and/or tag policy database 142 are a non-relational databases. In one embodiment, the tag database 140 and/or tag policy database 142 are No-SQL databases. Alternatively, other types of data stores may be used instead of the tag database 140 and/or tag policy database 142.

The tagging service 135 is responsible for creating tags, attaching tags to resources, managing tags, creating tag policies, associating tag policies with accounts, organization units (OUs) and/or organizations, and performing other operations with respect to tags. Tags may include email addresses, cost centers, project identifiers, location, team name, etc. The value may be a number, letters, or a combination of both. In some embodiments, the values may be limited to certain numbers or bytes, and some numbers and/or letter combinations may be excluded for special use. Tagging service 135 may store tags in tag database 140 and may store tag policies in tag policy database 142.

A client device 120 may use an API of the tagging service 135 to interface with tag policy manager 138 in order to generate tag policies and attach the tag policies to various units in an organization tree (e.g., to a root node of the organization tree repenting the organization as a whole, to an intermediate node of an organization unit (OU), to a leaf node of an account, and so on). The tag policy may specify that all tags attached to resources created by a particular account are to comply with a set of rules. For example, the tag policy may specify that the key portion of tags should all be capitalized. The tag policy may additionally or alternatively specify that resources associated with the account should have a particular tag attached to them (e.g., a "CostCenter" tag having a "CostCenter" key). The tag policy may additionally or alternatively specify that for a particular tag having the particular key (e.g., the "CostCenter" key) that tag should have a value from an enumerated set of permissible values (e.g., 1, 2, 3, 4, 5 or 6). The tag policy may additionally or alternatively include a regular expression rule for the key and/or value portion of a tag, a specified data type of the value portion of the tag (e.g., Boolean, string, number, float, etc.), a range of permitted values for the value portion of the tag, and so on. The regular expression rule may specify that the key portion and/or value portion should have a particular character length, particular data types, particular value ranges, and so on. The tag policy may impose a certain grammar and dictionary on tags. For example, a tag policy may specify that a resource that is tagged with any kind of tag must also be tagged with a particular tag. By placing restrictions of data types and/or ranges on tags, this may enable administrators to search within tags based on knowledge of the data types and/or values ranges within the tags. For example, by adding a tag policy that specifies "datatype:Number/Time & Date", the tagging system could provide correct treatment to values included in the tags. This could allow the tagging system to search for tags using search terms such as "greater than a value" or "within a particular date range".

Tag policies may be used to set whitelists of tags that are allowed and/or to set blacklists of tags that are not allowed. For example, a tag policy may be used to force resources to have only tags from a set of enumerated permissible tags. This may prohibit resources from having tags other than tags from the set of enumerated permissible tags. For example, a tag compliance rule of a tag policy may include a prohibition of tags that are not enumerated in the tag policy.

Once a tag policy is set up by the tag policy manager 138, the tag manager 139 applies the tag policies to tags. This may include analyzing a resource to determine if it includes a tag that is not enumerated in the tag policy. If the resource includes such a tag that is not enumerated in the tag policy, then the resource may not comply with the tag policy. Tag policies may also include negative tag policies that specify tags of certain types that are prohibited.

An administrator may also delete and/or modify tag policies via the tag policy manager 138. When a request to remove or edit a tag policy is received, the tag policy manager 138 may determine whether there are any accounts that are using the tag policy and/or if there are any conflicting tag policies further up or down an org tree that might conflict with a proposed update to a tag policy. If there are accounts that are using the tag policy, then the tag policy manager 138 may return an error and may not remove or edit the tag policy. For example, if a tag policy specifies that a tag may have a value of 1, 2 or 3, and an account has a resource that is using value 3 in a tag, then the tag policy may not be edited to permit only values 1 and 2. Similarly, if there is a first existing tag policy that will be combined with a second tag policy to be edited, and the update to the second tag policy will cause a conflict with the first tag policy, then the update to the second tag policy may not be permitted and may return an error. For example, if a tag policy at a root of an org tree is updated, then the update to that tag policy may be checked against every other tag policy in the org tree to see if the change causes a conflict with any of the other tag policies (e.g., to tag policies at an OU level and/or account level).

A client device 120 may use an API of the tagging service 135 to provide a command 150 to add a new tag (or to modify an existing tag, delete a tag, or delete a principal resource to which a tag is attached) in the tagging system 125. The client device 120 may be a computing device of an additional service, such as Amazon S3, Amazon EC2, or another cloud service. The command 150 may identify a principal resource to associate the tag with, a name of the tag and/or a value of the tag. A command may also be a create resource command, and may indicate one or more tags to create for the new resource. Tagging service 135 may include different create resource, tag resource, untag resource and/or modify tag APIs, for example.

Tagging service 135 includes tag manager 139, which is responsible for managing and applying tag policies. In some embodiments, tag manager 139 and tag policy manager 138 are combined into a single component. When a new tag is added to a resource, when a tag attached to a resource is modified, when a new resource with a tag is generated, and so on, tag manager 139 may apply one or more tag policies to the tag and/or resource to determine whether the tag and/or resource complies with one or more tag compliance rules of the tag policy. If a tag or resource violates any tag compliance rules of a tag policy applicable to that tag or resource, then the tag manager 139 may take remedial action with respect to the tag itself and/or with respect to the resource to which the tag is attached. The remedial action may include preventing the requested operation (e.g., preventing a tag from being modified or added, preventing the resource from being generated, and so on).

In an example, command 150 may be a create resource command that includes a sub-command to create a tag for the resource. The sub-command to create the tag may include a key/value pair of "Project":Green and "CostCenter":123. The command may have been received from the context of an account that is associated with a tag policy. Tag manager 139 may determine the tag policy associated with the account by sending a query comprising an identifier of the account to tag policy database 142 and receiving a response that includes information on the tag policy associated with the account.

The tag manager 139 may then compare the resource to the tag policy and/or a tag associated with the resource to the tag policy to determine if the tag compliance rule(s) of the tag policy are satisfied by the resource/tag. Tagging service 135 may include a first rule that is used to check the number of tags associated with a resource. If addition of the new tag will cause the total number of tags associated with the resource to exceed the maximum number of tags (tag threshold), then validation of the tag may fail and the tag may not be added to the resource. Tagging service 135 may include a valid characters rule that is used to check the proposed name and/or value for a tag. If the proposed name and/or value include non-valid characters (e.g., $, %, etc.), then validation of the tag may fail and the tag may not be created. Any number of tag compliance rules may also be specified in tag policies.

If the tag compliance rule(s) of the tag policy are satisfied, then the tagging service may perform the requested operation (e.g., generate a tag, generate a resource, notify another system to generate a resource, etc.) and may send a response 168 to the client device 120 indicating that the command 150 was successfully executed. However, if one or more tag compliance rules of the tag policy are not satisfied, then the tag manager 139 may perform a remedial action. If a tracking mode is enabled, then the operations of the command 150 may be executed, but an error notice may be generated. The response 168 may then indicate that the command was successful, but may include a notice that the resource and/or tag failed to comply with the tag policy. If an enforcement mode is enabled, then the operations of the command 150 may not be executed. The response 168 may then be an error response indicating that the command was not executed. The response 168 may further include a notice that the resource and/or tag failed to comply with the tag policy, and may optionally identify why the resource and/or tag failed to comply with the tag policy.

In some embodiments, tag manager 139 may generate a report of non-compliant tags and/or non-compliant resources. The report may indicate each tag and/or resource that is not compliant with a tag policy. Each entry in the report may indicate a particular tag policy that a tag and/or resource is not in compliance with, a particular tag compliance rule that is violated, and/or additional information such as an account associated with the tag or resource, a region or territory associated with the tag or resource, and so on. The report may include non-compliant tags and/or resources across regions, across accounts, and so on. The report may also be filtered based on account, region, tag policy, and/or some other data.

In some embodiments, tag manager 139 provides a user interface for tag generation and/or resource generation. Client device 120 may issue command 150 via the user interface in embodiments. A user may access the user interface, and may select a create resource operation. Tag manager 139 may then determine if any tag policies apply in the context of a current account. If a tag policy applies, then tag manager 139 may generate an output (e.g., a graphical output) indicating that a tag having a particular key or a key with particular syntax should be attached to the resource. Once the key for the tag is selected, an output may be generated that identifies an enumerated list of permissible options for the value portion of the tag. The user may then select one of the permissible values from the list. Accordingly, users may be provided with selections of options for tag creation that comply with a tag policy.

In some instances, client device 120 may send command 150 to tagging server device 130 if an operation on or from the client device references a tag (e.g., a command to create, modify or delete a tag) and/or if a resource referenced on the client device 120 includes a tag (e.g., a command to generate a resource that includes a tag). However, some tag policies may specify that a specific tag should be attached to a resource. If the resource does not include any tag, then a command 150 may not get sent to tagging server device 130, which then would be unable to determine whether the resource complies with the tag policy that dictates that a specific tag should be attached to the resource. This may be mitigated by causing all operations of particular types (e.g., all resource generation operations) on the client device 120 to trigger a call or command 150 to the tagging server device 130. For example, if a generate resource command is received by client device 120, the client device may forward the command to tagging server device 130 and/or may send information about the resource to be generated to tagging server device 130, regardless of whether the resource includes an attached tag. In one embodiment, policies may be set at the organization level, OU level and/or account level to always call the tagging service 135 when resources are generated to enable the tag manager 139 to determine whether the resource complies with a tag policy.

In one embodiment, an IAM system 102 is connected to tagging system 125. The IAM system 102 includes one or more IAM server devices 105 connected to an IAM database 110. The IAM server device 105 may include physical machines and/or virtual machines and/or other virtual resources (e.g., containers) hosted by physical machines. The physical machines may be rackmount servers, desktop computers, or other computing devices. The virtual machines and/or containers may be managed and provided by a cloud provider system. Each virtual machine offered by a cloud service provider may be hosted on a physical machine configured as part of a cloud. Such physical machines are often located in a data center.

The IAM server device 105 may execute an IAM service 107. The IAM service 107 may perform standard IAM operations, such as creating and managing users, roles, groups, permissions, and so on. The IAM service 107 may implement attribute based access control based at least in part on tags of the users, the roles and/or the groups, rather than using identity access control that relies on access control lists for specific resources (e.g., a whitelist of user identifiers for a particular resource). By using tags, administrators and possibly other users can easily manage access to computer resources by adding, removing, or changing tags of resources such as users, roles and/or groups.

In order to enable identification of resources that do not include a particular tag specified by a tag policy, the IAM service 107 may place an access control policy on a resource that requires the resource to have a tag. For example, the IAM service 107 may determine which users may access which computing resources based on tags of the user and/or tags or tag conditions of the computing resources. A tag condition may be different than a tag. For example, a resource may have a tag "Project":Green, but a tag condition of "Project":"*" which requires a user to have a project tag, but no specific tag value for that project tag. In another example, an administrator may create an access control policy in the IAM service 107 that specifies that any create resource request that does not include a tag in the request should be rejected. Therefore, if a customer supplies no tags in a request, then the access control policy of the IAM service 107 would reject that request. Accordingly, the IAM service 107 may be leveraged to force developers to create tags for resources. Once a tag is attached to a resource, then the IAM service 107 contacts tagging service 135 to find out information about the tag.

This may cause the IAM server device to issue a compliance request 155 to tagging server device 130 when an operation is to be performed on a resource (e.g., when the resource is to be accessed, modified, created, used to access another resource, and so on). The tag manager 139 may then determine whether the specified resource and/or a tag attached to the specified resource complies with a tag policy and send a compliance response 160 indicating whether or not the resource and/or tag complies with the tag policy. This may enable the tagging service to apply tag policies to resources that do not include any tags attached thereto.

FIGS. 2A-2B and 4A-4B illustrate various methods associated with application and enforcement of tag policies. The methods may be performed by a processing logic that may comprise hardware (e.g., circuitry, dedicated logic, programmable logic, microcode, etc.), software (e.g., instructions run on a processing device to perform hardware simulation), or a combination thereof. The processing logic may execute on one or many processing devices in a cloud environment. Where the processing logic is distributed across multiple processing devices, each of the processing devices may perform one or more of the operations for a method. The processing logic may execute on tagging server device 130 of FIG. 1 in embodiments (e.g., may correspond to processing logic of tag policy manager 138 and/or tag manager 139).

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 2A:
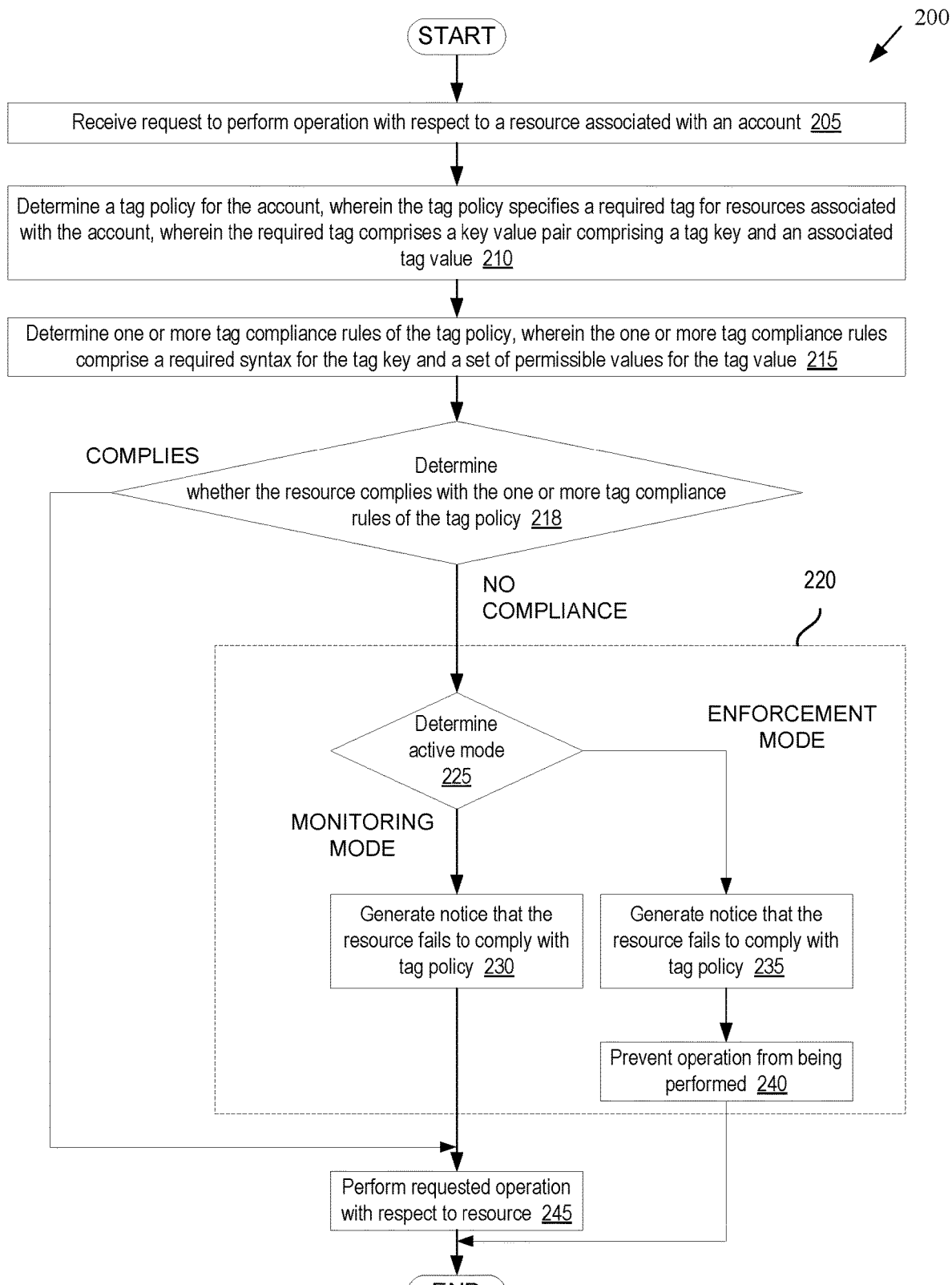
FIG. 2A is a flow diagram of one embodiment for a method of implementing a tag policy with respect to a resource.

FIG. 2A is a flow diagram of one embodiment for a method 200 of implementing a tag policy with respect to a resource. At block 205, processing logic receives a request to perform an operation with respect to a resource associated with an account. The request may be a request to add a tag to the resource, to modify a tag attached to the resource, to delete a tag from the resource, to generate the resource (and optionally an associated tag), to access another resource based on an access policy associated with the resource, to modify the resource, and so on. The request may include information about the resource and/or about one or more tags attached to or to be created for the resource (e.g., such as a tag key or name and a tag value).

At block 210, processing logic determines a tag policy for the account. The tag policy may specify a required tag for resources associated with the account (e.g., for resources generated from a context of the account). The required tag may include a key/value pair with specific requirements for the key and/or the value. The requirements may be specific values, specified syntax, capitalization requirements, regex requirements, and so on. The specified syntax in a tag compliance rule may therefore be or include a set of rules for the analysis of the key and/or value portions of a tag. The specified syntax for tags may dictate acceptable ways in which different components (e.g., characters) of keys and/or values are put together in order to provide an acceptable tag.

Each required tag syntax specified in a tag compliance rule may include a particular name, a particular spelling of a particular name, a particular capitalization regardless of name, a particular capitalization for a particular name, a particular sequence of text characters, punctuation marks, numbers, and/or additional characters, a particular range of values, a particular regex, and so on. An example tag compliance rule may require, for example, that all tag keys be capitalized, that all tag keys have a maximum character length (e.g., of 12 characters), that all tag keys contain a first name and a second name separated by a punctuation mark, and so on. An example tag compliance rule may further specify that a tag key of a tag has a particular sequence of characters (e.g., a particular name).

At block 215, processing logic determines one or more tag compliance rules of the tag policy. The one or more tag compliance rules may include a required syntax for the tag key and/or a set of permissible values for the tag value. The set of permissible values may be an enumerated set of values. Alternatively, or additionally, the set of permissible values may include all values having a particular data type, all values within a specified range, all values complying with a regex, and so on. At block 218, processing logic determines whether the resource complies with the one or more tag compliance rules (also referred to as validation rules) of the tag policy. If the resource complies with all of the tag compliance rules of the tag policy, then the method proceeds to block 245. If the resource fails to comply with a tag compliance rule, the method proceeds to block 220 or 225. For example, the tag policy may specify that a tag with a key of "CostCenter" and a value of any one of "1, 2, 3, 4, 5 or 6" should be attached to the resource. If the resource has been tagged with a single tag of "costcenter":"1" or "user": "Jon", then the resource would not be in compliance with the tag policy.

At block 220, processing logic determines one or more remedial actions to perform with respect to the resource. The remedial action or actions that are performed may depend on an active mode associated with the account. Accordingly, at block 225, processing logic may determine an active mode of the account. The active mode may be a monitoring (or tracking) mode or an enforcement mode in one embodiment. If the monitoring mode is active, the method continues to block 230. If the enforcement mode is active, the method continues to block 235.

The monitoring mode does not enforce tag policies and does not reject operations based on a failure to comply with tag policies. Instead, while the monitoring mode is active processing logic generates reports on resources that failed to comply with tag policies so that such resources can be corrected so that they will comply with the tag policies in the future. Accordingly, at block 230 processing logic generates a notice that the resource fails to comply with the tag policy. The notice may indicate why the resource failed to comply with the tag policy in some embodiments, such as indicating which specific tag compliance rules of the tag policy were not satisfied. The method then continues to block 245.

At block 245, processing logic performs the requested operation with respect to the operation (e.g., generates the resource and/or associated tag in one embodiment).

While the enforcement mode is active, processing logic actually enforces tag policies, which may include rejecting operations if resources associated with those operations are not in compliance with a tag policy. Accordingly, at block 235 processing logic generates a notice that the resource fails to comply with the tag policy. The notice may specify why the resource failed to comply with the tag policy. At block 240, processing logic prevents the operations from being performed (e.g., rejects the operation). This may include, for example, preventing a new resource that does not comply with the tag policy from being generated or preventing a tagging operation from being completed. For example, if the operation was a tag on create operation that specified a particular resource to be generated and a particular tag to be generated and attached to the resource, then the tag to be attached to the resource may have been compared to the tag policy. Failure of that tag to comply with the tag compliance rules in the tag policy would cause the tag on create operation to fail, preventing the tag and the resource from being generated.

In one embodiment, processing logic rejects or accepts tagging calls. However, the tagging calls may be associated with a tag on create operation. With the tag on create operation, a new resource should be created with a new tag. However, by rejecting the creation of the new tag, processing logic causes the creation of the new resource to also be rejected, even though processing logic may not directly reject the generation of the new resource.

Figure 2B:
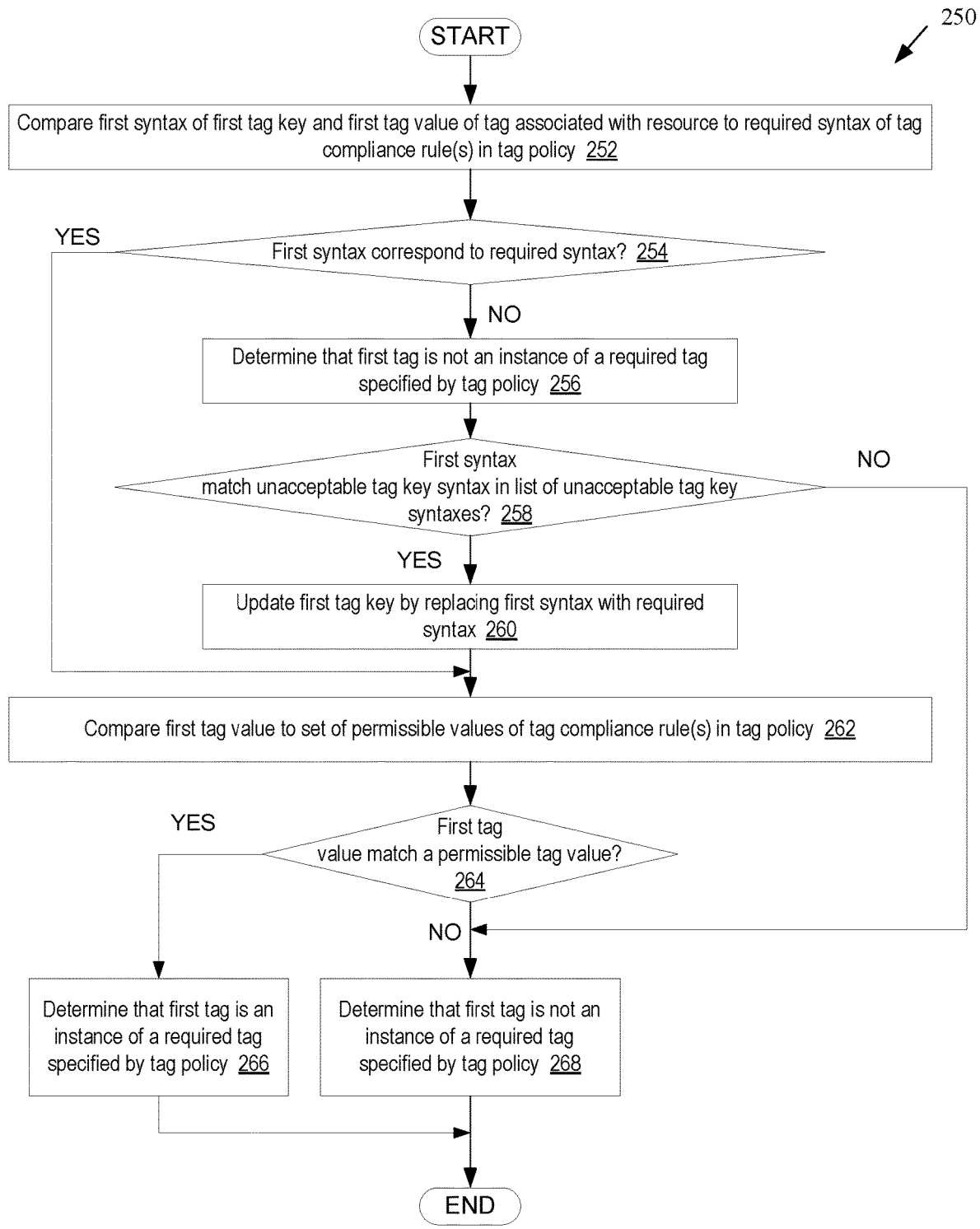
FIG. 2B is a flow diagram of one embodiment for a method of determining whether a resource complies with a tag policy.

FIG. 2B is a flow diagram of one embodiment for a method 250 of determining whether a resource complies with a tag policy. Method 250 may be performed after a tag is received or identified (e.g., in a create tag request). The tag may be associated with a resource (e.g., a create tag request may have been received to attach a new tag to a particular resource). Method 250 may be performed, for example, at block 218 of method 200.

At block 252 of method 250, processing logic compares a first syntax of a first tag key for the tag associated with the resource to a required syntax of a tag compliance rule in a tag policy. Processing logic may also compare a tag value of the tag to the required syntax of the tag compliance rule(s) in the tag policy. Different syntax requirements may be specified for the key portion of the tag and the value portion of the tag in embodiments.

At block 254, processing logic determines whether the first syntax for the first tag key corresponds to the required syntax specified in the tag policy. This may include determining whether the first tag key is an exact match to a permissible tag key specified in a tag compliance rule in the tag policy. If the first syntax corresponds to the required syntax, the method proceeds to block 262. If the first syntax does not correspond to the required syntax, the method continues to block 256.

At block 256, processing logic determines that the first tag is not an instance of a required tag specified by the tag policy.

At block 258, processing logic determines whether the first syntax matches an unacceptable tag key syntax in a list of unacceptable tag key syntaxes. A tag policy may include or be associated with an acceptable tag key syntax (e.g., an acceptable tag key name) and a list of similar but unacceptable tag key syntaxes (e.g., unacceptable tag key names). Each tag key syntax may include a particular name, a particular spelling of a particular name, a particular capitalization regardless of name, a particular capitalization for a particular name, a particular sequence of text characters, punctuation marks, numbers, and/or additional characters, a particular regex, a particular range of dates and/or values, and so on. For example, an acceptable tag key name may be "CostCenter", and similar unacceptable tag key names may be "costcenter", "Cost Center", "Cost center", "CC", and so on. If the first syntax matches an unacceptable tag key syntax in the list, the method may continue to block 260. Otherwise, the method may proceed to block 268.

At block 260, processing logic may automatically modify or update the tag key by replacing the first syntax (e.g., the first name) that matches an unacceptable syntax with the associated required syntax (e.g., a required name). For example, the tag key "CC" may be replaced with the tag key "CostCenter".

At block 262, processing logic compares the first tag value to a set of permissible tag values of the tag compliance rule or rules in the tag policy. At block 264, processing logic determines whether the first tag value matches a permissible tag value. If a match is found, the method continues to block 266. If no match is found, the method continues to block 268.

At block 266, processing logic determines that the first tag is an instance of a required tag specified by the tag policy.

At block 268, processing logic determines that the first tag is not an instance of a required tag specified by the tag policy.

Figure 3:
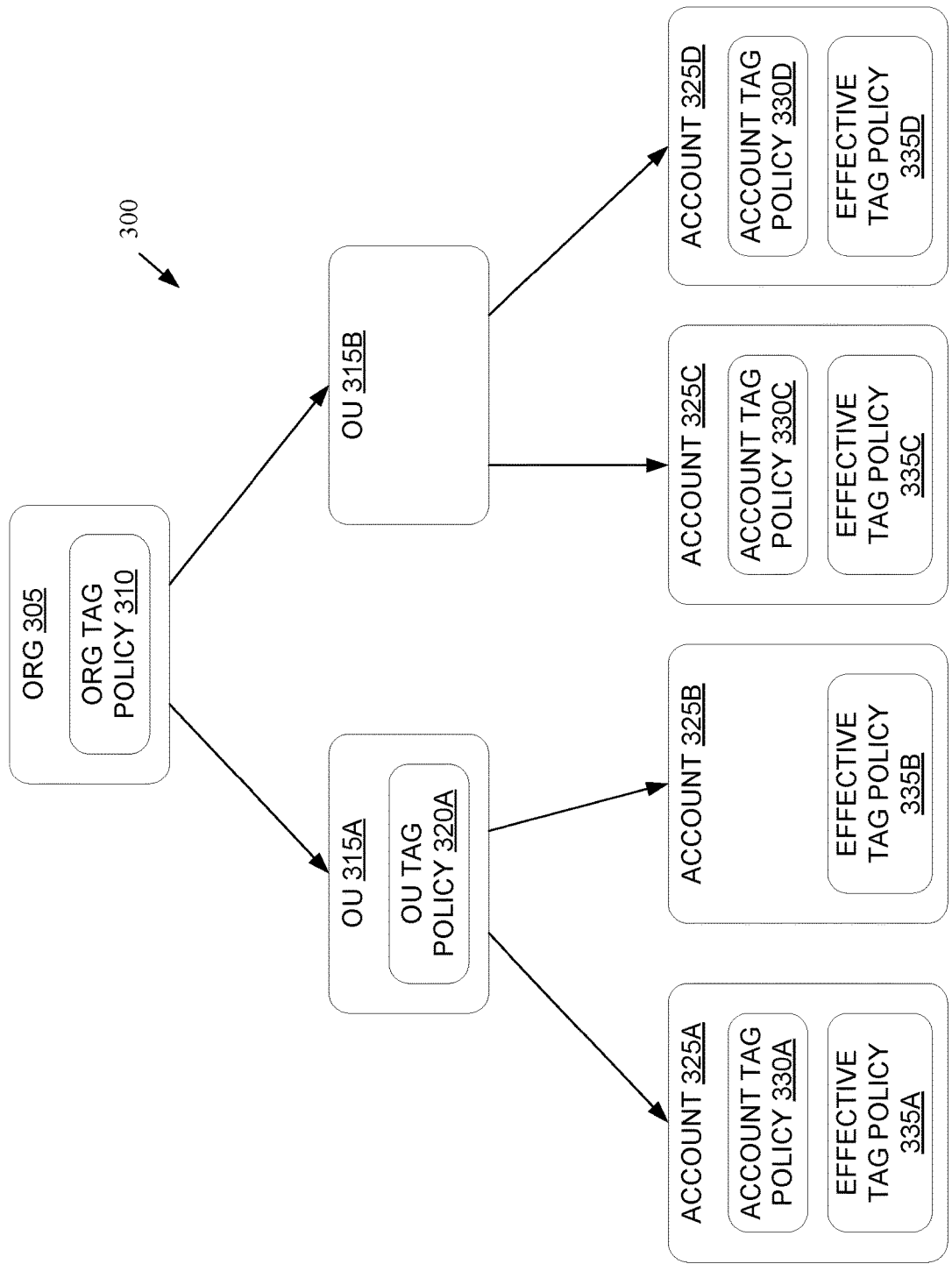
FIG. 3 illustrates an example tree data structure representing an organization, in accordance with one embodiment.

FIG. 3 illustrates an example tree data structure 300 representing an organization, in accordance with one embodiment. As shown, an organization (e.g., for a company) may be a hierarchical structure that may be represented in a tree data structure. A root of the tree data structure may be a root node for the organization (org) 305. An organization level tag policy 310 may be associated with the root node for the organization 305. The organization level tag policy 310 may apply to all accounts 325A-D in the organization.

The root node for the organization 305 may be connected to intermediate nodes for OUs 315A, 315B. Each OU may include a distinct OU level tag policy, or may not include an OU level tag policy. Each OU level tag policy may apply to all accounts linked to a particular OU in the tree data structure 300. In the example, intermediate node for OU 315A is associated with an OU level tag policy 320A. In one embodiment, OU level tag policy 320A is more restrictive than the organization level tag policy 310. Additionally, the OU level tag policy 320A may not contain any tag compliance rules that contradict tag compliance rules of the organization level tag policy 310. In other words, in some embodiments the OU level tag policy 320A may be less permissive than organization level tag policy 310 but not more permissive than organization level tag policy 310. For example, the organization level tag policy 310 may include a first tag compliance rule that the key portion of all tags should be capitalized and may include a second tag compliance rule that all resources should include a tag having a key of "CostCenter" and a value that is one of 1, 2, 3, 4, 5 or 6. The OU level tag policy 320A may include a further tag compliance rule that a tag should have a key of "CostCenter" and a value of 1, 2 or 3. However, the OU level tag policy 320A in some embodiments may not include a rule that all resources should be tagged with a tag having a key of "CostCenter" and a value of 5, 6 or 7 because the value of 7 is not permitted by the organization level tag policy 310.

An intermediate node for OU 315A is connected to leaf nodes for account 325A and account 325B. Similarly, an intermediate node for OU 315B is connected to leaf nodes for account 325C and account 325D. Each account may include a distinct account level tag policy or may not include an account level tag policy. In the example, account 325A includes account level tag policy 330A, account 325C includes account level tag policy 330C and account 325D includes account level tag policy 330D. These different account level tag policies 330A-D may include the same tag compliance rules and/or different tag compliance rules from one another. In one embodiment, account level tag policy 330A is more restrictive than the organization level tag policy 310 and the OU level tag policy 320A. Additionally, the account level tag policy 330A may not contain any tag compliance rules that contradict tag compliance rules of the organization level tag policy 310 or OU level tag policy 320A in embodiments.

Resources are associated with accounts. When a resource is created, that resource is created in the context of an account. However, multiple different tag policies may be applicable to a resource and/or tag created in the context of an account. For example, a tag in the context of account 325A is subject to account level tag policy 330A, OU level tag policy 320A and organization level tag policy 310 (following the path from the org 305, through the OU 315A to the account 325A). In order to efficiently determine the set of tag compliance rules to apply to tags associated with an account, tag policy manager 138 may compute and store effective tag policies 335A-D for each of the accounts 325A-D. Each effective tag policy 335A-D may be a combination of each of the tag policies along the path of nodes from the root node of the org 305 to the leaf node of a particular account. The combination may be a concatenation of multiple tag policies, a blending of multiple tag policies, an intersection of tag compliance rules of multiple tag policies, or some other combination of tag policies. The effective tag policy 335A-D for an account 325A-D describes the constraints that are applicable to that particular account. In the generation of the effective tag policies, the tag policy manager may effectively perform denormalization so that each account has a single record (the effective tag policy for that account) that identifies the tag compliance rules for that account. As a result, when a request is received to determine whether a resource and/or tag complies with the tag policies for an account, a single lookup may be performed to determine the entire set of tag compliance rules that should be met for the resource and/or tag.

In an example, an effective tag policy 335A for account 325A may combine the account level tag policy 330A, OU level tag policy 320A and organization level tag policy 330. Similarly, effective tag policy 335B for account 325B may combine OU level tag policy 320A and organization level tag policy 310. Similarly, effective tag policy 335C may combine account level tag policy 330C and organization level tag policy 310. In some instances an effective tag policy includes the intersection of each of the tag compliance rules from multiple tag policies. In one embodiment, organization level tag policies 310 may include tag compliance rules with regular expressions, but OU legal tag policies and account level tag policies may not include tag compliance rules with regular expressions.

At any time an administrator may modify one more tag policies in the tree data structure 300. When a change to a tag policy is made, all of the effective tag policies affected by that change may be recomputed and updated to account for the change.

In some instances, conflicts may exist between tag compliance rules in two tag policies that are being combined to form an effective tag policy. For example, the organization level tag policy 310 may include a tag compliance rule that all resources should include a tag having a key of "CostCenter" and a value that is one of 1, 2, 3, 4, 5 or 6. The OU level tag policy 320A in some embodiments may include a rule that all resources should be tagged with a tag having a key of "CostCenter" and a value of 5, 6 or 7. Where conflicts are identified, tag policy manager 138 may determine a tag policy prioritization, and apply the tag policy prioritization to select which of the tag compliance rules to include in the effective tag policy. For example, a default prioritization may be to apply the tag compliance rule associated with the higher level node when conflicts between tag policies are identified. In another example, a user may be permitted to select an override flag, which may cause a particular lower level tag policy (e.g., an account level tag policy) to override a higher level tag policy (e.g., an organization level tag policy). In such an instance, the tag policy prioritization may select the tag compliance rules of the lower level tag policy for use in the effective tag policy. In one embodiment, tag policies may include a flag that indicates whether lower level tag policies are permitted to override some or all tag compliance rules of the tag policy. In some embodiments, permissions may be provided for some tag compliance rules of a tag policy to be overridden but not for other tag compliance rules of the tag policy to be overridden.

In one embodiment, tag policies are applied across regions. For example, tag policies (including effective tag policies) may be copied between regions so that the same tag policies apply to each region. Alternatively, different tag policies may apply to the same accounts in different regions. In one embodiment, a first region includes the full tree data structure and each of the tag policies associated with nodes in the tree data structure. However, in embodiments only the effective tag policies of accounts are propagated to other regions. In some embodiments, an administrator may select which regions to replicate tag policies to.

Figure 4:
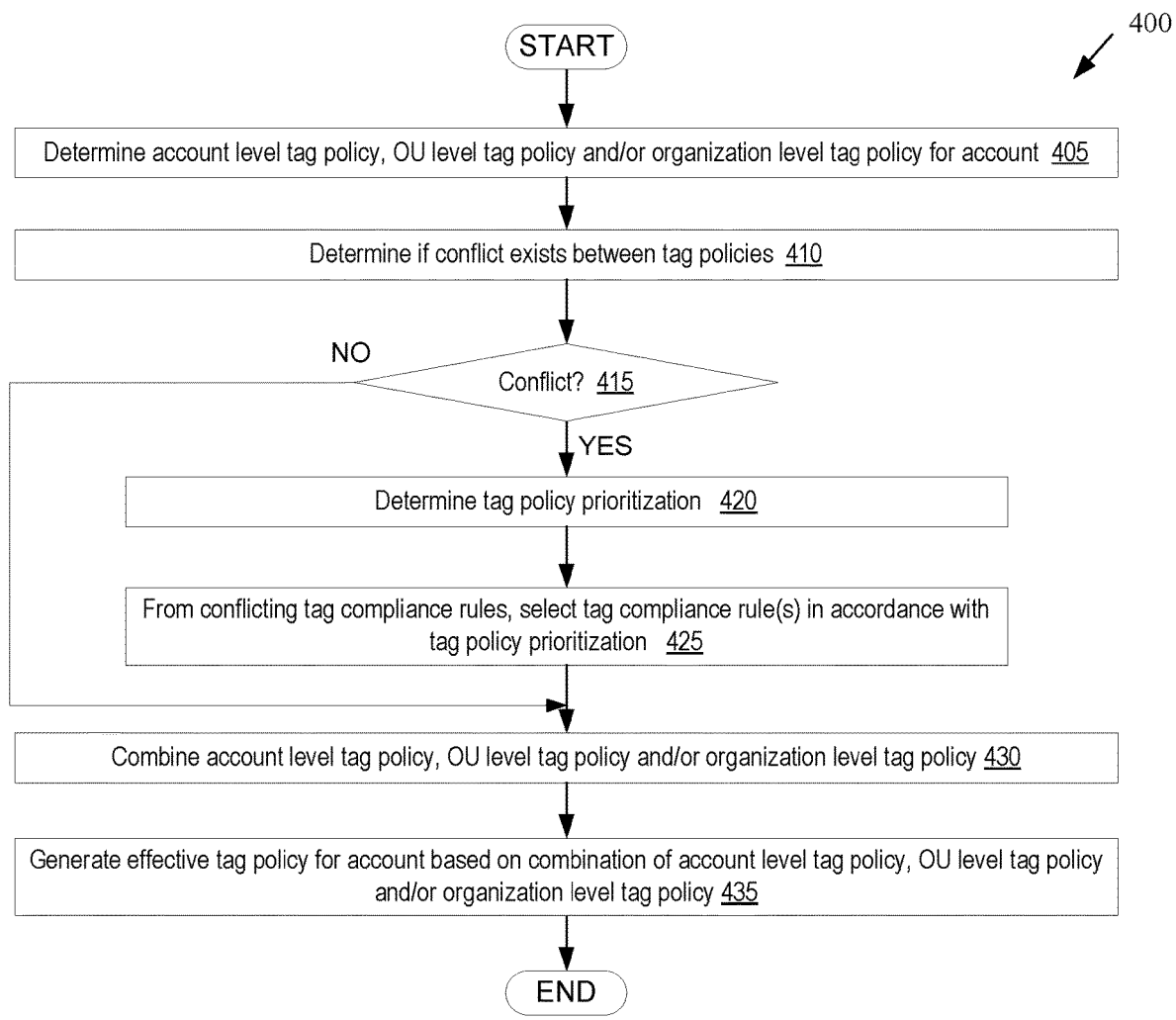
FIG. 4 is a flow diagram of one embodiment for a method of generating an effective tag policy for an account represented by a node in a tree data structure.

FIG. 4A is a flow diagram of one embodiment for a method 400 of generating an effective tag policy for an account represented by a node in a tree data structure. At block 405 of method 400, processing logic determines all of the tag policies that are applicable to an account. This may include walking a path in a tree data structure from a root node representing an organization to a leaf node representing an account. In one embodiment, an account level tag policy, an OU level tag policy and an organization level tag policy are identified.

At block 410, processing logic determines if any conflicts exist between tag policies that are applicable to the account. At block 415, if a conflict exists, the method continues to block 420. If no conflict exists, then the method proceeds to block 430.

At block 420, processing logic determines a tag policy prioritization associated with the account, with one or more of the tag policies, with one or more tag compliance rules in any of the tag policies, and so on. Examples of tag policy prioritization may include a default policy to always apply a tag compliance rule of a higher level tag policy in the case of a conflict and an override that specifies that a lower level tag policy and/or a specific tag compliance rule of a lower level tag policy is to take precedence over a higher level tag policy. At block 425, processing logic selects, from the conflicting tag compliance rules, one or more tag compliance rules to use in accordance with the determined tag policy prioritization.

At block 430, processing logic combines all of the tag policies applicable to the account (e.g., the account level tag policy, the OU level tag policy and/or the organization level tag policy). This may include computing an intersection of the two or more tag policies and/or merging two or more tag policies. For example, the tag compliance rules of a first tag policy may be merged with the tag compliance rules of a second tag policy to result in a new tag compliance rule. The new tag compliance rule may include the intersection of the first and second tag compliance rules in an embodiment. At block 435, processing logic generates an effective tag policy for the account based on the combination of the account level tag policy, the OU level tag policy and/or the organization level tag policy.

In embodiments, tag policies may be implemented in a stepwise fashion for organizations that already have a full organization tree set up and that are already in a production mode. Implementation of the tag policies should occur without interrupting critical functions of the organization. To minimize impact, tag policies may initially be implemented in a monitoring mode. While the tag policies are in the monitoring mode, records may be generated for instances of resources and/or tags that fail to comply with the tag policy. These records may provide detailed reports of what went wrong (e.g., which resources/tags failed to comply with which tag policies and/or with which tag compliance rules of particular tag policies), under which account, in which region, for which service, and so on. In embodiments, a queue of errors may be generated, and administrators may work through the queue, correcting tags and/or resources.

Administrators may modify the tags and/or resources to cause them to comply with the tag policies. Once few or no errors are being generated for a tag policy (due to failure of resources and/or tags to comply with the tag policy), then the tag policy may be switched from a monitoring mode to an enforcement mode. While the enforcement mode is active, operations that do not comply with the tag policy may be blocked. For example, operations to create new tags and/or resources that fail to comply with the tag policy may be blocked.

Another technique that is used to minimize the impact of tag policy implementation on an organization is to apply tag policies from the leaf level, ensure compliance at the leaf level, then work on tag policies at the OU level, and then at the organization level.

Figure 5:
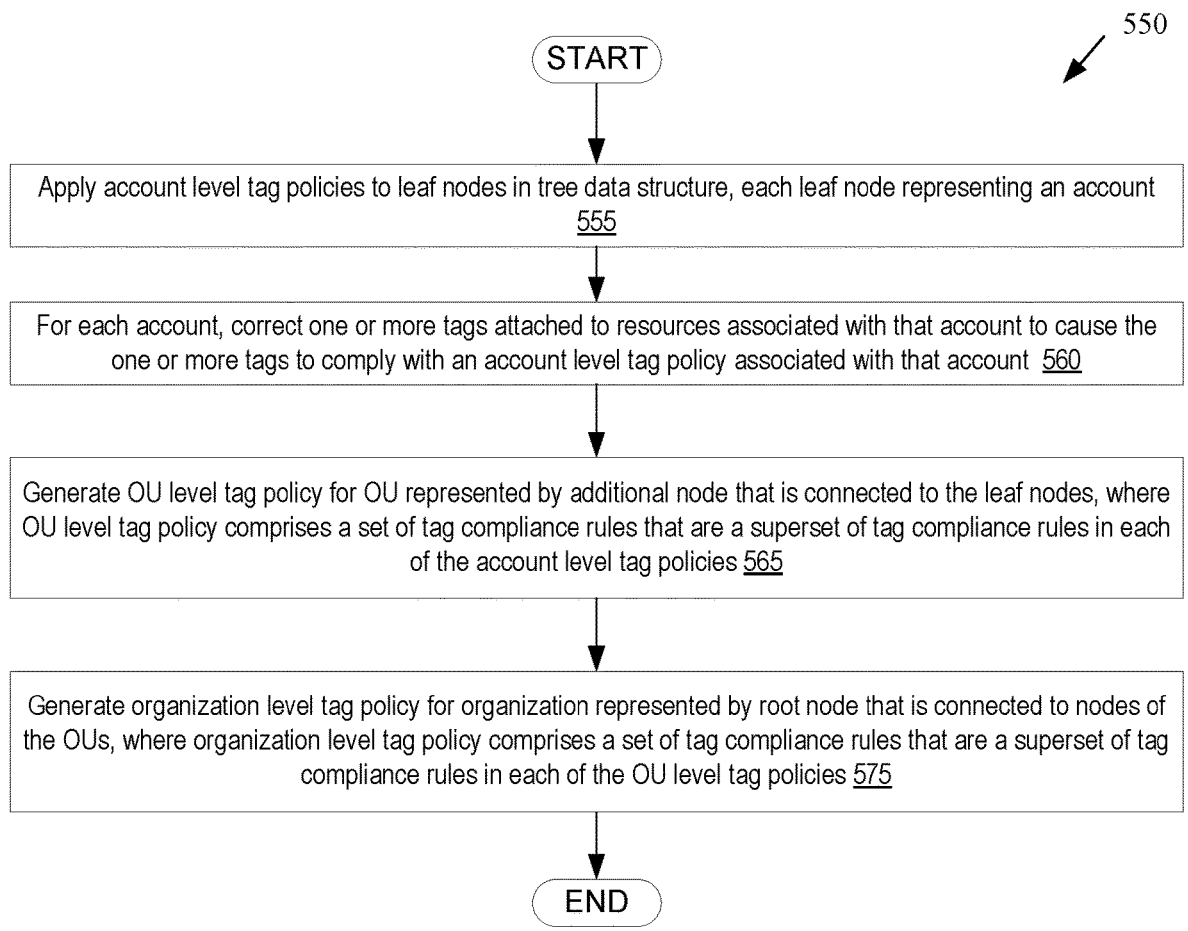
FIG. 5 is a flow diagram of one embodiment for a method of applying tag policies to nodes in a tree data structure.

FIG. 5 is a flow diagram of one embodiment for a method 550 of applying tag policies to nodes in a tree data structure. At block 555 of method 550, processing logic applies account level tag policies to leaf nodes in a tree data structure. Each leaf node may represent a different account in an organization. At block 560, for each account processing logic may correct one or more tags attached to resources associate with that account. This may cause the one or more tags to comply with an account level tag policy associated with an account. Once resources and tags are cleaned up such that they comply with account level tag policies, the method proceeds to block 565.

At block 565, processing logic generates an OU level tag policy for an OU represented by an intermediate node in the tree data structure that is connected to the leaf nodes. The OU level tag policy may include a set of tag compliance rules that are a superset of the tag compliance rules in each of the account level tag policies of the leaf nodes that are connected to the intermediate node of the OU. In one embodiment, the OU level tag policy is automatically generated by determining a set of rules that capture the tag compliance rules of each of the account level tag policies. For example, if one account level tag policy permits values of 1 and 2 for a tag, and another account level tag policy permits values of 3 and 4 for the tag, then the automatically generated OU level tag policy may permit values of 1-4 for the tag to accommodate the two different account level tag policies. The operations of block 565 may be performed for each OU in the tree data structure. Once the OU level tag policies are created, the method may proceed to block 575.

At block 575, processing logic generates an organization level tag policy for the organization. The organization level tag policy is applied to a root node that represents the organization. The root node may be connected to the intermediate nodes of each of the OUs. The organization level tag policy may include a set of tag compliance rules that are a superset of tag compliance rules in each of the OU level tag policies. In some embodiments, the organization level tag policy is automatically generated.

Figure 6:
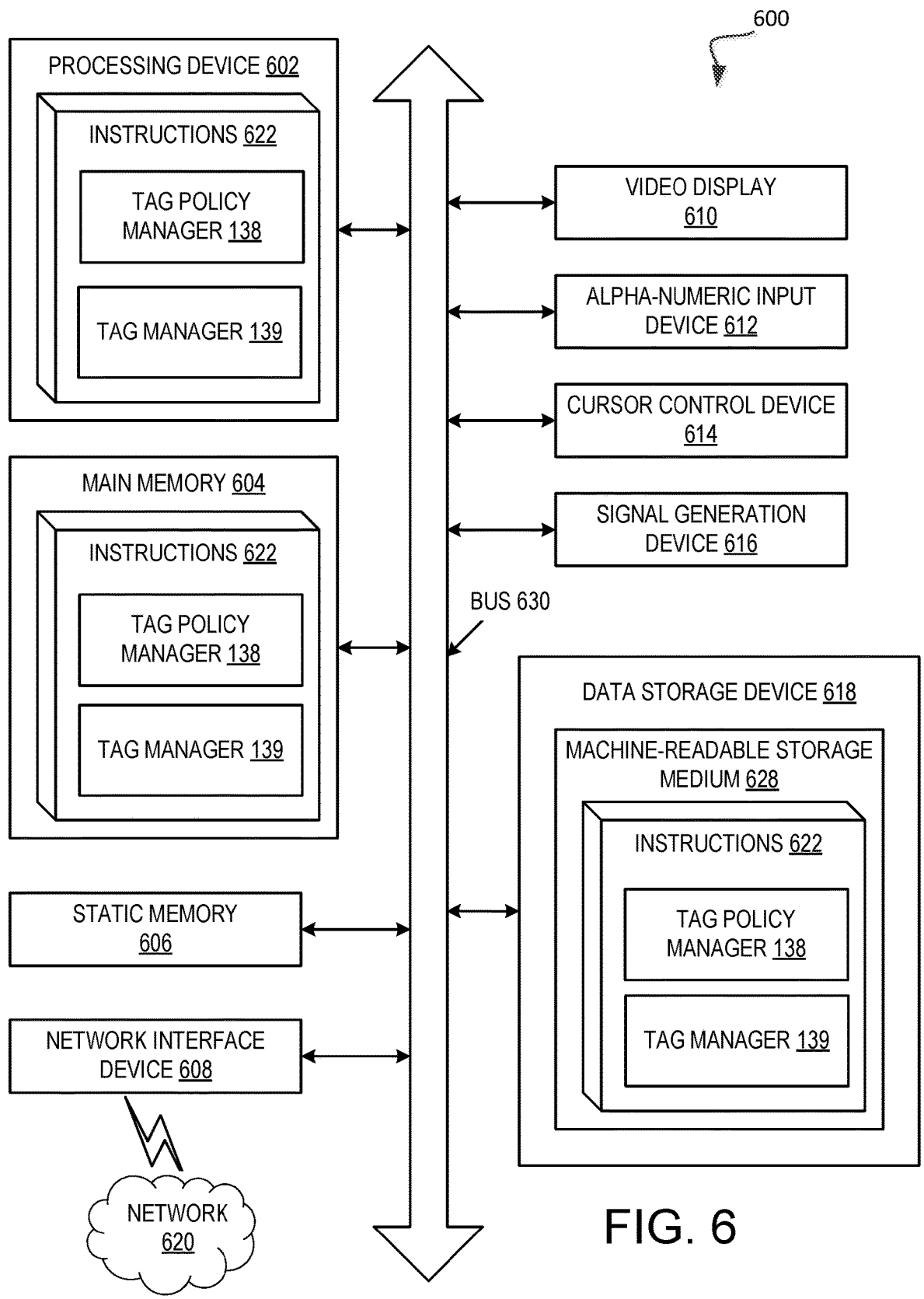
FIG. 6 is a schematic block diagram that provides one example illustration of a computing device executing a tagging service, according to one embodiment of the present disclosure.

FIG. 6 illustrates a diagrammatic representation of a machine in the exemplary form of a computer system (computing device) 600 within which a set of instructions, for causing the machine to perform any one or more of the methodologies discussed herein, may be executed. The computer system 600 may be in the form of a computer system within which a set of instructions, for causing the machine to perform any one or more of the methodologies discussed herein, may be executed. The system may be a single compute node in an on-demand configurable pool of shared computing resources in some embodiments. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, compute node, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (e.g., a processor) 602, a main memory device 604 (e.g., read-only memory (ROM), flash memory, dynamic random access memory (DRAM) such as synchronous DRAM (SDRAM)), a static memory device 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for synchronization logic 108 (e.g., APIs) for performing the operations discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions of tag policy manager 138 and/or tag manager 139 embodying any one or more of the methodologies or functions described herein. The instructions may also reside, completely or at least partially, within the main memory 604 and/or within processing logic of the processing device 602 during execution thereof by the computer system 600, the main memory 604 and the processing device 602 also constituting computer-readable media.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 7:
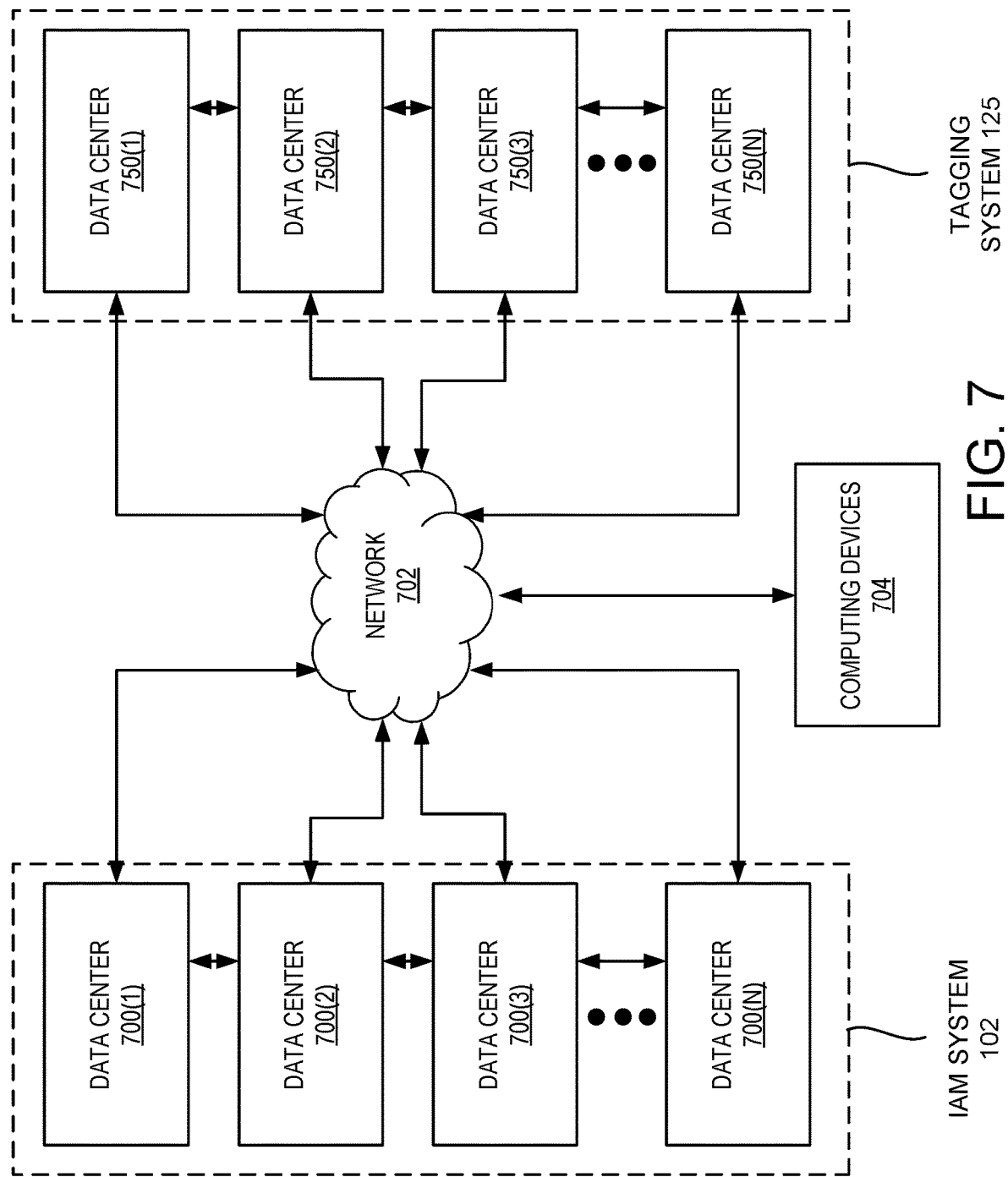
FIG. 7 is a system and network diagram that shows an illustrative operating environment that includes an identity and access management system in communication with a tagging system over a network.

FIG. 7 is a system and network diagram that shows an illustrative operating environment that includes an IAM system 102 in communication with a tagging system 125 over a network 702. The systems can execute network services, such as the data storage and data streaming, and/or provide computing resources on a permanent or an as-needed basis. Among other types of functionality, the computing resources provided by the systems, or by a larger system of which the system is a part, can be utilized to implement various network services, tagging services, and/or IAM services described herein. As also discussed above, the systems may be part of a larger system that provides additional computing resources that include, without limitation, data storage resources, data processing resources, such as virtual machine (VM) instances, networking resources, data communication resources, network services, and other types of resources.

Each type of computing resource provided by either system, or by a larger system of which the systems may be a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The systems, or a larger system of which the systems are a part, can also be configured to provide other types of computing resources not mentioned specifically herein.

The computing resources provided by the systems, or a larger system of which the systems are a part, are enabled in one implementation by one or more data centers 700(1), 700(2), 700(3), . . . , 700(N) for the IAM system 102 and by one or more data centers 750(1), 750(2), 750(3), . . . , 750(N) for the tagging system 125. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 8.

The users of the systems can access the computing resources provided by the systems over network 702, which can be a wide area communication network ("WAN"), such as the Internet, an intranet or an Internet service provider ("ISP") network or a combination of such networks. For example, and without limitation, a computing device 704 (e.g., the client device 120) operated by a user of the system can be utilized to access the system by way of the network 702. It should be appreciated that a local-area network ("LAN"), the Internet, or any other networking topology known in the art that connects the data centers to remote users and other users can be utilized. It should also be appreciated that combinations of such networks can also be utilized.

Figure 8:
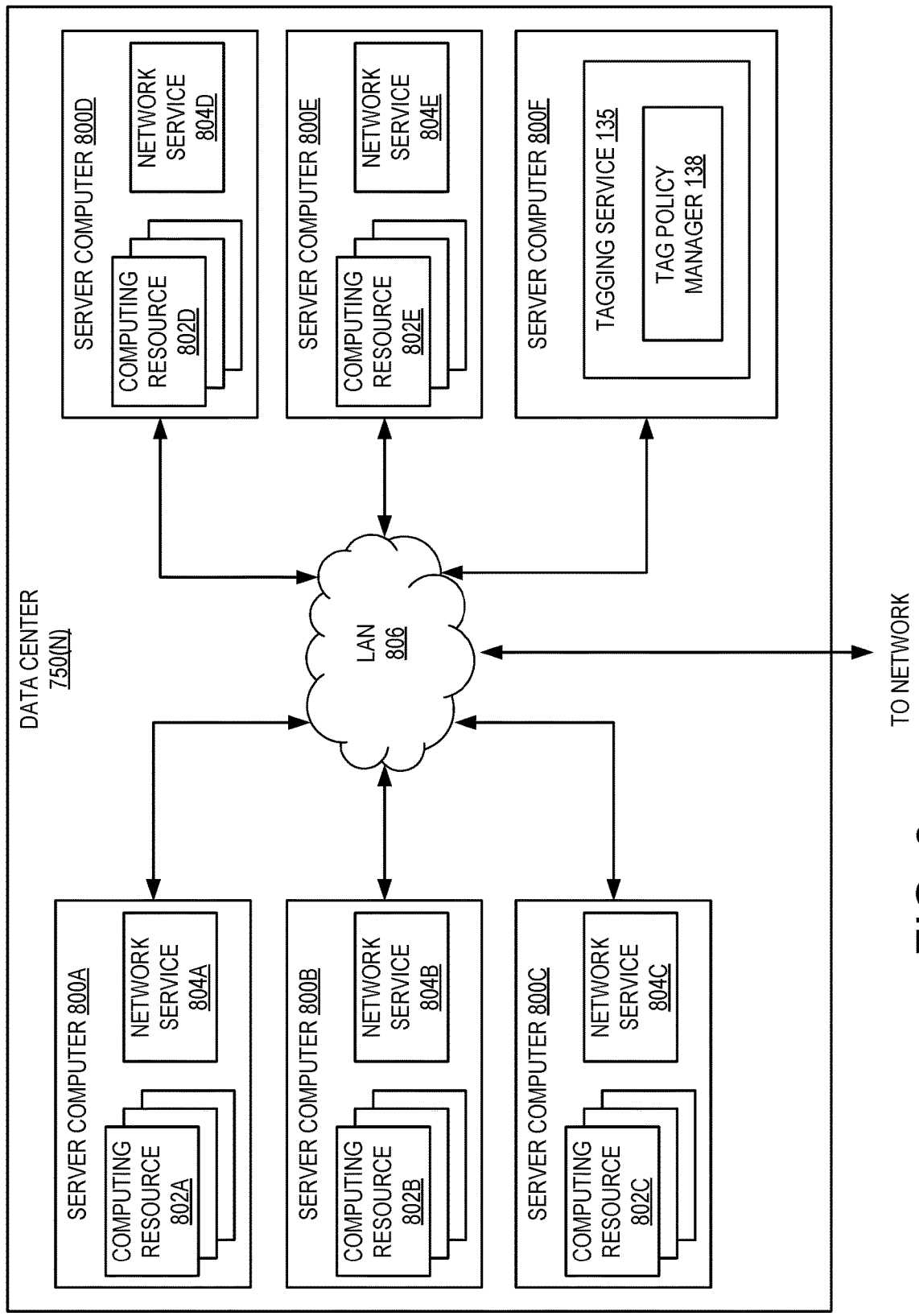
FIG. 8 is a computing system diagram that illustrates one configuration for a data center that can be utilized to implement the tagging service, and in particular the tag policy manager, and/or any other network services disclosed herein.

FIG. 8 is a computing system diagram that illustrates one configuration for a data center 750(N) that can be utilized to implement the tagging service 135, and in particular the tag policy manager 138 and/or tag manager 139, as described above, and/or any other network services disclosed herein. The example data center 750(N) shown in FIG. 8 includes several server computers 800A-800E (collectively 800) for providing computing resources 802A-802E (collectively 802), respectively. Each server computer 800A-E may correspond to computer system 600 of FIG. 6 in an embodiment.

The server computers 800 can be standard tower, rackmount, or blade server computers configured appropriately for providing the various computing resources described herein (illustrated in FIG. 8 as the computing resources 802A-802E). As mentioned above, the computing resources 802 provided by the system, or a larger system of which the system is a part, can include, without limitation, analytics applications, data storage resources, data processing resources such as VM instances or hardware computing systems, database resources, networking resources, and others. Some of the server computers 800 can also be configured to execute network services 804A-804E (collectively 804) capable of instantiating, providing and/or managing the computing resources 802.

The data center 750(N) shown in FIG. 8 also includes a server computer 800F that can execute some or all of the software components described above. Server computer 800F may correspond to computer system 600 of FIG. 6 in an embodiment. For example, and without limitation, the server computer 800F can be configured to execute the tagging service 135 and in particular the tag policy manager 138 and/or tag manager 139, which in some implementations may be separate from the tagging service 135. The server computer 800F can also be configured to execute other components and/or to store data for providing some or all of the functionality described herein. In this regard, it should be appreciated that components or different instances of the tagging service 135 can execute on many other physical or virtual servers in the data centers 800 in various configurations.

In the example data center 750(N) shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 750(1)-(N), between each of the server computers 800A-800F in each data center 700, and, potentially, between computing resources 802A-E in each of the data centers 700. It should be appreciated that the configuration of the data center 800 described with reference to FIG. 8 is merely illustrative and that other implementations can be utilized.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "adding", "receiving", "storing", "generating", "sending", "performing", "writing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    generating a first tag policy for an account represented by a leaf node in a tree data structure, wherein the first tag policy comprises a first tag compliance rule associated with the account;
    generating a second tag policy for an additional node at a higher level in the tree data structure that represents an organization unit (OU), wherein the second tag policy comprises a second tag compliance rule associated with the account, and wherein the additional node is linked to the leaf node;
    generating an effective tag policy for the account by combining the first tag policy and the second tag policy, wherein the effective tag policy specifies a required tag for resources associated with the account, wherein the required tag comprises a key value pair comprising a tag key and an associated tag value, and wherein the effective tag policy comprises a combination of the first tag compliance rule and the second tag compliance rule, the combination comprising a required syntax for the tag key and a set of permissible values for the tag value;
    receiving a request to generate a resource associated with the account;
    determining that the resource fails to comply with the combination of the first tag compliance rule and the second tag compliance rule in the effective tag policy; and
    performing a remedial action with respect to the resource.

2. The method of claim 1, wherein the resource comprises a first tag comprising a first tag key and a first tag value, the method further comprising:
    comparing a syntax of the first tag key to the required syntax specified in the combination of the first tag compliance rule and the second tag compliance rule;
    determining that the syntax of the first tag key fails to satisfy the required syntax;
    determining that the first tag is not an instance of the required tag;
    determining that the syntax of the first tag key matches an unacceptable tag key syntax in a list of unacceptable tag key syntaxes; and
    updating the first tag key by replacing the syntax of the first tag key with the required syntax.

3. The method of claim 1, wherein the resource comprises a first tag comprising a first tag key and a first tag value, the method further comprising:
    comparing a syntax of the first tag key to the required syntax specified in the combination of the first tag compliance rule and the second tag compliance rule s;
    determining that the syntax of the first tag key satisfies the required syntax in the combination of the first tag compliance rule and the second tag compliance rule;
    comparing the first tag value of the first tag key to the set of permissible values in the combination of the first tag compliance rule and the second tag compliance rule;
    determining that the first tag value fails to match any permissible tag value in the combination of the first tag compliance rule and the second tag compliance rule; and
    determining that the first tag is not an instance of the required tag.

4. The method of claim 1, further comprising:
    determining that a tag policy monitoring mode is active;
    generating a notice indicating that the resource fails to comply with the effective tag policy; and
    generating the resource.

5. A method comprising:
    receiving a request to perform an operation with respect to a resource associated with an account;
    determining a tag policy for the account, wherein the tag policy comprises a combination of a first tag policy and a second tag policy, wherein the tag policy specifies a required tag for the resource associated with the account, wherein the required tag comprises a key value pair comprising a tag key and an associated tag value;
    determining one or more tag compliance rules of the tag policy, wherein the one or more tag compliance rules comprise a required syntax for the tag key and a set of permissible values for the tag value;
    determining that the resource fails to comply with the one or more tag compliance rules of the tag policy; and
    performing a remedial action with respect to the resource.

6. The method of claim 5, wherein the resource comprises a first tag comprising a first tag key and a first tag value, the method further comprising:

comparing a syntax of the first tag key to the required syntax specified in the one or more tag compliance rules;
determining that the syntax of the first tag key fails to satisfy the required syntax in the one or more tag compliance rules; and
determining that the first tag is not an instance of the required tag.

7. The method of claim 6, further comprising:
determining that the syntax of the first tag key matches an unacceptable tag key syntax in a list of unacceptable tag key syntaxes; and
updating the first tag key by replacing the syntax of the first tag key with the required syntax.

8. The method of claim 5, wherein the resource comprises a first tag comprising a first tag key and a first tag value, the method further comprising:
comparing a syntax of the first tag key to the required syntax specified in the one or more tag compliance rules;
determining that the syntax of the first tag key satisfies the required syntax in the one or more tag compliance rules;
comparing the first tag value of the first tag key to the set of permissible values in the one or more tag compliance rules;
determining that the first tag value fails to match any permissible tag value in the set of permissible values; and
determining that the first tag is not an instance of the required tag.

9. The method of claim 5, wherein the resource comprises a first tag comprising a first tag key and a first tag value, and wherein the one or more tag compliance rules comprise a prohibition of tags that are not enumerated in the tag policy, the method further comprising:
determining that the first tag is an instance of the required tag;
determining that the resource comprises an additional tag; and
determining that the additional tag is not enumerated in the tag policy.

10. The method of claim 5, wherein the operation is a resource generation operation, the method further comprising:
determining that a tag policy monitoring mode is active;
generating a notice indicating that the resource fails to comply with the one or more tag compliance rules of the tag policy; and
generating the resource.

11. The method of claim 5, wherein the operation is a resource generation operation, the method further comprising:
determining that a tag policy enforcement mode is active;
generating a notice indicating that the resource fails to comply with the one or more tag compliance rules of the tag policy; and
preventing generation of the resource.

12. The method of claim 5, wherein the account is represented by a leaf node in a tree data structure, wherein the leaf node is linked to an additional node at a higher level in the tree data structure that represents an organization unit (OU), wherein the account comprises the first tag policy comprising a first tag compliance rule, and wherein the OU comprises the second tag policy comprising a second tag compliance rule, the method further comprising:
combining the first tag policy and the second tag policy; and
generating the tag policy based on a combination of the first tag policy and the second tag policy, wherein the tag policy comprises the first tag compliance rule and the second tag compliance rule.

13. The method of claim 12, further comprising:
determining that the first tag compliance rule conflicts with the second tag compliance rule;
determining a tag policy prioritization associated with the account; and
selecting the first tag compliance rule or the second tag compliance rule for the tag policy in accordance with the tag policy prioritization, wherein the second tag compliance rule or the first tag compliance rule that is not selected is not included in the tag policy.

14. The method of claim 5, further comprising:
receiving a query from an identity and access management (IAM) system, wherein the IAM system comprises an access control policy for the resource specifying that the resource must comprise at least one tag, and wherein the query requests confirmation that the resource comprises a tag; and
determining that the resource lacks any tag.

15. The method of claim 5, further comprising:
generating a report of at least one of non-compliant tags or non-compliant resources, wherein the report comprises a list of at least one of non-compliant tags that fail to comply with the tag policy or non-compliant resources that fail to comply with the tag policy across a plurality of regions and a plurality of accounts.

16. The method of claim 5, wherein the account is represented by a leaf node of a plurality of leaf nodes in a tree data structure, each of the plurality of leaf nodes representing a different account, wherein the plurality of leaf nodes are linked to an additional node at a higher level in the tree data structure that represents an organization unit (OU), the method further comprising:
applying account level tag policies to the leaf nodes in the tree data structure, wherein the tag policy is an account level tag policy;
for each account of the different accounts, correcting one or more tags attached to resources associated with that account to cause the one or more tags to comply with a tag level account policy associated with that account; and
subsequently applying an OU level tag policy to the additional node that represents the OU, wherein the OU level tag policy comprises a set of tag compliance rules that are a superset of the one or more tag compliance rules of the tag policy and tag compliance rules of a remainder of the account level tag policies.

17. A system comprising:
a memory to store instructions; and
a processing device operatively coupled to the memory, wherein execution of the instructions causes the processing device to:
determine a tag policy for an account responsive to a request to perform an operation with respect to a resource associated with the account, wherein the tag policy comprises a combination of a first tag policy and a second tag policy, wherein the tag policy specifies a required tag for the resource associated with the account, wherein the required tag comprises a key value pair comprising a tag key and an associated tag value;

determine one or more compliance rules of the tag policy, wherein the one or more tag compliance rules comprise a required syntax for the tag key and a set of permissible values for the tag value;

determine that the resource fails to comply with the one or more tag compliance rules of the tag policy; and perform a remedial action with respect to the resource, wherein the remedial action comprises at least one of a) failing to perform the operation or b) generating a report indicating that the resource fails to comply with the one or more tag compliance rules of the tag policy.

18. The system of claim 17, wherein the resource comprises a first tag comprising a first tag key and a first tag value, and wherein the processing device is further to:

compare a syntax of the first tag key to the required syntax specified in the one or more tag compliance rules;

determine that the syntax of the first tag key fails to satisfy the required syntax in the one or more tag compliance rules; and determine that the first tag is not an instance of the required tag.

19. The system of claim 18, wherein the processing device is further to:

determine that the syntax of the first tag key matches an unacceptable tag key syntax in a list of unacceptable tag key syntaxes; and update the first tag key by replacing the syntax of the first tag key with the required syntax.

20. The system of claim 18, wherein the resource comprises a first tag comprising a first tag key and a first tag value, and wherein the processing device is further to:

compare a syntax of the first tag key to the required syntax specified in the one or more tag compliance rules;

determine that the syntax of the first tag key satisfies the required syntax in the one or more tag compliance rules;

compare the first tag value of the first tag key to the set of permissible values in the one or more tag compliance rules;

determine that the first tag value fails to match any permissible tag value in the set of permissible values; and determine that the first tag is not an instance of the required tag.

* * * * *